United States Patent
Bakke

[15] 3,671,725
[45] June 20, 1972

[54] DEAD TIME PROCESS REGULATION

[72] Inventor: Roger M. Bakke, Los Gatos, Calif.

[73] Assignee: International Business Machines Corporation, Armonk, N.Y.

[22] Filed: Oct. 1, 1970

[21] Appl. No.: 77,387

Related U.S. Application Data

[63] Continuation-in-part of Ser. No. 490,592, Sept. 27, 1965, abandoned.

[52] U.S. Cl. .......................................... 235/150.1, 444/001
[51] Int. Cl. ....................................................... G05b 13/00
[58] Field of Search ........ 235/150.1, 151.1, 151.12, 151.34; 318/601, 636

[56] References Cited

UNITED STATES PATENTS

| 3,141,982 | 7/1964 | Smith | 235/150.1 X |
| 3,175,764 | 3/1965 | Lupfer et al. | 235/151.1 X |
| 3,534,400 | 10/1970 | Dahlin | 235/151.1 X |
| 3,582,629 | 6/1971 | Ross | 235/151.1 |

OTHER PUBLICATIONS

Bristol et al.; Adaptive Process Control by Pattern Recognition, Instruments and Control Systems March 1970 p. 101/105.

Vercammen et al.; Parameters Quickly Determined, Second Order Model with Dead Time, Control Engineering April 1970 p. 79/81

Primary Examiner—Felix D. Gruber
Attorney—Hanifin and Jancin and John H. Holcombe

[57] ABSTRACT

Method of regulating processes having dead time wherein an error signal is generated representing the deviation of a controlled variable from a set point. The error signal is compared to a predetermined limit, and if it exceeds the limit, it is employed to regulate the process. If it does not exceed the limit, the process dead time is determined by impressing a high frequency disturbance onto the process at a control point, detecting the disturbance at the process output, and the time interval therebetween determined.

10 Claims, 5 Drawing Figures

Patented June 20, 1972

INVENTOR.
ROGER M. BAKKE

BY *[signature]*

AGENT 3,671,725

DEAD TIME PROCESS REGULATION

This is a continuation-in-part of application Ser. No. 490,592, filed Sept. 27, 1965, now abandoned.

BACKGROUND OF THE INVENTION

1. Field of the Invention

This invention relates to the automatic control of processes. More particularly, it relates to a method of controlling processes having a dead time wherein current values of dead time are calculated repetitively.

2. Description of the Prior Art

Dead time processes are those processes in which an input change does not cause any change in output for a finite period of time. Phrased another way, the dead time in a system may be expressed as the time transpiring between the initiation of a corrective action in the system and the detection of the effect of that corrective action upon the system.

A common example of such a process may be found in those industries where it is desired to maintain, at an elevated level, the temperature of a liquid flowing through a pipe. Some sort of heat source is necessary to supply heat to the liquid. The heat source is located next to the pipe at a certain distance upstream from a temperature measuring unit. In such a process, the dead time of the system then equals the time interval required for the heated liquid to move from the point of heat application to the point of temperature measurement.

Processes having a dead time may be contrasted to those processes having a delay. Processes with delay are those in which the final value of an output change resulting from an input change is delayed by a finite period of time, but the initial value of output change is immediately apparent or measurable. It is of importance to note here that processes having a plurality of delays built into them may eventually approximate for control purposes a process having a single dead time period.

There have been a number of process control approaches suggested in the prior art ranging from crude, almost completely manual systems to the sophisticated approaches of today, which use medium to large scale digital computers as the central controlling element. Each control approach, be it simple or sophisticated, has experienced difficulties due to certain associated problems—and many of these problems arise from the process characteristics.

Similarly, in those processes characterized by a dead time, it has been difficult to truly optimize the control operation. That difficulty is largely due to one factor—namely, the current inability to accurately calculate an explicit value of a variable dead time at some given time directly from process measurements made at that time.

As an attempt to overcome this difficulty, the prior art provided compensating approaches for the control of dead time processes. One class of existing controllers requires the implementation of a dead time model to provide a compensation for the destabilizing effect of process dead time; this is generally known as a predictor controller. Another class of dead time controller, known as an interrupting controller, intentionally interrupts or delays the control action. A third approach has utilized the mathematics of certain difference equations for a system having a plurality of dead times or a single varying dead time. However, even these control schemes are oriented toward the control of systems having a fixed dead time. Any benefits derived from the use of such special dead time controllers over conventional proportional plus integral controllers have been demonstrated as contingent upon the dead time in the process being known and the controller adjusted accordingly.

In view of the above, a controller that could update its process model with current dead time values is a desirable item. However, there are several inherent obstacles to the development, or utilization, of such a controller. The initial obstacle has been the difficulty of providing an acceptable dead time model with conventional control hardware. The second obstacle has been the dependency of dead time control strategy on the premise that the process has a fixed dead time. This invention overcomes both of these obstacles.

SUMMARY OF THE INVENTION

Accordingly, it is a general object of the invention to provide an improved method of control for processes having dead time.

Briefly stated, then, one aspect of my invention resides in a method of regulating processes having dead time. In that method, a first signal is generated which indicates the deviation of a controlled variable in the process from a predetermined set point. That first signal is compared to a second signal, representing a predetermined error limit of the controlled variable. If this comparison indicates that the process does not require regulation, a current value of dead time is calculated and made available for subsequent regulatory operations. However, if the comparison indicates that the process requires regulation, a control signal is generated for that purpose.

In accordance with another aspect of my invention, I provide a method for determining the dead time of a controlled process so as to update a mathematical model of that process. The method comprises a series of steps including measuring a signal representative of process operations; determining that this signal is within prescribed limits; and, if not, performing a process regulating operation to bring the process within the prescribed limits. However, if the signal is within limits, a high frequency signal is impressed onto a process controlling variable, and the time of high frequency signal impression is measured. Then, the high frequency signal is filtered at the process output, and the time at which the filtering occurs is measured. A value of dead time is then obtained by calculating the interval between the two measured times.

In accordance with yet another aspect of my invention, a unique method of calculating dead time in systems having a transport-velocity lag is disclosed. The velocity of the process medium is sensed at a number of discrete time periods. Similarly, the distance of the process medium from some datum point is also sensed at a plurality of discrete time periods. Individual signals representing the individual values of distance, both at singular time points, are generated. These signals are, in a serial fashion, provided to a computing apparatus wherein the dead time of the process under regulation is calculated from a mathematical relationship which includes establishing the integral of velocity over a time period equal to the dead time and equating that value of velocity to distance. The new value of dead time thus calculated is then provided to a mathematical model of the process in order to optimize the process regulation.

Among the prime advantages offered by this invention is the ability to optimize the regulation of a process having dead time. A most vital input to the process controller in this area is an up-to-date calculation of the process dead time. Prior to this, such a calculation has been extremely difficult and time consuming to make; now, a mathematical model of the system can be updated on a nearly real time basis. This achievement is obtained, not at the expense of complex equipment, or at the expense of vast amounts of calculation time, but rather by utilizing a simple and straightforward method.

Another of the advantages offered by this invention is the ability to apply it to processes having either a true dead time or a number of delays approximating a single dead time. Flexibility is also available in that an introduced disturbance may be extracted either at the process output itself or at an auxiliary station.

The foregoing and other objects, features and advantages of this invention will be apparent from the following more detailed description of preferred embodiments of the invention as illustrated in the accompanying drawings.

DESCRIPTION OF THE PREFERRED EMBODIMENTS

Figure 1:
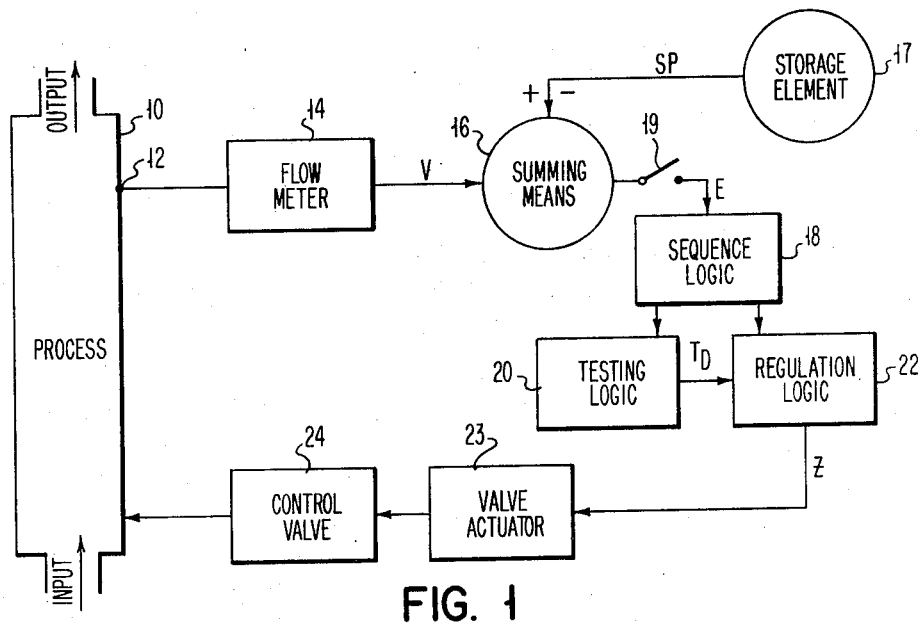
FIG. 1 represents a block diagram of a process control system utilizing a first preferred embodiment of this invention.

With general reference to FIG. 1, it shows in simplified block diagram fashion, a process 10 having dead time being regulated in accordance with the method of this invention. Regulated process 10 has a controlled and controlling variable. The status of the controlled variable is sensed at terminal 12 by flow meter 14, which provides a status-representative signal V to summing means -'. Signal V is there compared to some standard value (or set point) signal SP generated by storage element 17, and summing means 16 provides an error signal E. Error signal E is fed to sequence logic 18 from summing means 16. If error signal E is greater than some prescribed value $E_s$, sequence logic 18 selects, and operates, regulation logic 22; the latter logic, through the cooperation of valve a actuator 23 and control valve 24, changes the controlling variable so as to regulate process 10. Once the controlled variable is thereby brought within prescribed limits, and sequence logic 18 notes that fact, testing logic 20 is operated in order to calculate the most current value of process dead time $T_D$. This new value of dead time is then provided to regulation logic 22, which includes a mathematical model of the process being regulated. Process regulation is thereby optimized.

Looking at the structure of FIG. 1 in more detail, process 10 may be any of the processes mentioned in the introduction to this application. It has a flow of process medium from input to output. That flow (or controlled variable) is sensed at terminal 12 by flow meter 14. An example of flow meter 14 is the Foxboro 81T Series Turbine Flow Transmitter, available from Foxboro Co., Neposent Ave., Foxboro, Massachusetts. Storage element 17, as well as flow meter 14, are connected to a summing means 16. An example of summing means 16 is the Foxboro Model 66C Summing Amplifier, available from Foxboro Co., above. Storage element 17, which may be an operator's console or higher level computer, contains an indication of the process set point—i.e., that value at which process medium flow is to be maintained. An example of storage element 17 is the IBM Set Point Station, Model 891, available from the IBM Industrial Products Division, 1000 Westchester Ave., White Plains, N. Y. Sequence logic 18 is also connected to summing means 16 through periodically operated switch 19. Summing means 16 generates an error signal representative of the difference between the process set point and the status of the controlled variable. The operations performed are indicated in terms of the illustrated logical arrangement. Following sequence logic 18 are testing logic 20 as well as regulation logic 22; testing logic 20 and regulation logic 22 are similarly arranged. Regulation logic 22 operate valve actuator 23, which, in turn, governs the operation of control valve 24; valve 24 operates on a controlling variable so as to affect the value of the process medium flow (or, as noted, the controlled variable). An example of valve 2 is the Foxboro Stabiflow Type F8 Valve, and an example of valve actuator 23 to operate the above Stabiflow valve is the Foxboro diaphragm Pneumatic Type F8 Valve Operator together with the Foxboro Model 69PA-1 Current-to-Air Valve Positioner, all of which are available from Foxboro Co., above.

With further reference to FIG. 1, the method of this invention relates to maintaining a controlled variable constant in value, and this is accomplished by manipulating a controlling variable in accordance with certain mathematical relationships as explained hereafter. A measure of process medium flow is obtained at terminal 12 by flow meter 14, and this measure is transmitted to summing means 16 by means of a signal V. Also fed to summing means 16 is a signal SP from storage element 17 representing the set point, or desired value of the controlled variable.

Summing means 16, in response to the signals available from flow meter 14 and storage element 17, generates an error signal E. The value of this error signal E is periodically sampled and compared by sequence logic 18 to some predetermined error signal value $E_s$. Should the value of the error signal E be greater than the predetermined value $E_s$, sequence logic 18 operates regulation logic 22. Regulation logic 22 then generates control signals, and these are supplied to valve actuator 23 and control valve 24 so as to effect changes in a controlling variable thereby regulating process 10. Regulation logic 22 in this operation utilizes a previously calculated value of process dead time $T_D$ in the mathematical model of the process.

Should, however, the value of error signal E be less than $E_s$, then sequence logic 18 operates testing logic 20. Testing logic 20 calculates, from certain measured parameters of process 10, a current value of process dead time $T_D$; the manner of calculation is more fully described subsequently. This current value of process dead time $T_D$ is then provided to regulation logic 22. Regulation logic 22 now has a current value of process dead time $T_D$ so that process regulation may be effected by using the best available data—thereby optimizing the process regulation operation.

Figure 2:
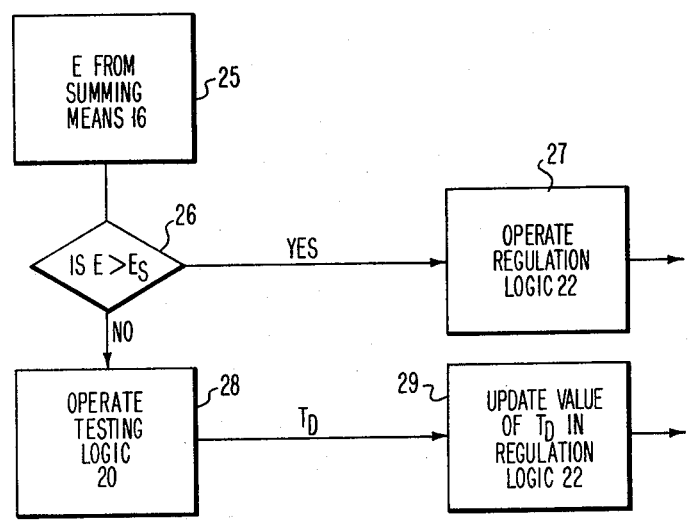
FIG. 2 represents in symbolic form the steps for practicing the general method of this invention.

FIG. 2 has been included to show, by means of symbolic logic, the method of this invention in its most general form. With reference to FIG. 2, block 25 represents the generation of an error signal E from the summing means 16. In block 26, the step of comparing the error signal E to some standard error signal $E_s$ (which is practiced by sequence logic 18 in FIG. 1) is shown. Should the resolution of this comparison be that E is greater than $E_s$, then block 27 indicates that regulation logic 22 is operated so as to bring the process back within prescribed limits. Should however, the comparison in block 26 indicate that E is not greater than $E_s$, block 28 indicates that testing logic is then operated so as to calculate a new value of dead time $T_D$. As indicated in block 29, this most current value of dead time $T_D$ is then provided to regulation logic 22.

Now that the first preferred embodiment of this invention has been set forth in general terms, the various operations in that first preferred embodiment will be explained in more detail. Much of the invention is described in the form of a mathematical exposition, since that provides the precision necessary to enable one skilled in this art to practice the method, while retaining the necessary scope which renders the method applicable to the control of any process possessing dead time.

Figure 3:
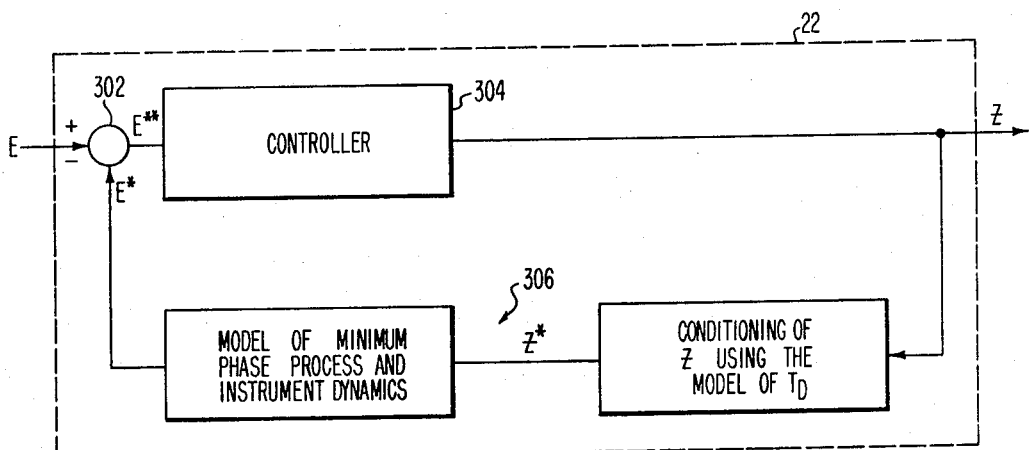
FIG. 3 shows the process regulatory operation in more detail.

Looking first at the regulatory operation in conjunction with FIG. 3, regulation logic 22 is shown within dotted lines. Entering logic 22 is error signal E, made available from sequence logic 18, and it is applied to a summing means 302. In order to generate a control signal Z, summing means 302 provides a modified error signal E, as will be explained hereafter, to a conventional two mode digital controller 304, which may be a digital computer capable of executing a control algorithm. Such a controller 304 would be capable of implementing a two mode equation where $$Z = K_1 E^{} + K_2 \sum_i E^{**} \quad (1.0)$$

where $K_1$ and $K_2$ are gain constants for the particular process. A first modified error signal E* is obtained through the feedback of the control signal Z through means 306 which employ the most current value of dead time $T_D$ and a model of the minimum phase process and instrument dynamics for the particular process to generate E*. In generating E*, a modified value of Z is employed, and this may be expressed as a time-related function in equation 1.1:

$$Z^*(t) = Z(t) - Z(t-T_D) \quad (1.1)$$

It can be seen that equation 1.1, in a continuous process control environment, would require the constant calculation and generation of quantities at some present time as well as some past time. This is not practical in machine oriented systems due to the costs of storage needed to handle these generated quantities. As an alternative then, the following calculation scheme is used:

An estimate of difference between the current value of a controlling variable and the oldest stored value of that variable is used in the regulatory operation, and is expressed in equation 1.2, which may be calculated readily by a digital computer:

$$Z^*(i) = Z(i) - Z(j-k) - \zeta \qquad (1.2)$$

where:
- $i$ = sampling index of the control computation, or more simply, a factor indicating the frequency of operation of switch 19 in FIG. 1;
- $j$ = sampling index for additions to storage in the mathematical model of the process being regulated;
- $k = 0, 1, 2, \ldots K$ representing the number of values of Z in the storage spaces allocated in regulation logic elements 22, up to a maximum of K—which is the number of storage words available for this purpose in a machine—
- $\zeta$ is a correction factor for errors which may occur in between successive measurements (or calculations) of the controlling variable value.

The correction factor $\zeta$ may be calculated from the equation 1.3:

$$\zeta = \frac{Z(j-k+n) - Z(j-k-n)}{2n \cdot \Delta} \cdot \beta + \left[\frac{Z(j-k+n) + Z(j-k-n) - 2Z(j-k)}{2(n \cdot \Delta t)^2}\right] \cdot \beta^2 \qquad (1.3)$$

Several new variables have been introduced here, among them being $\beta$, which bears a relation to the process dead time. Dead time, as measured, may occur between several fixed sampling increments of $\Delta t$ (defined below); $\beta$ is a number which indicates where the dead time occurs within a given increment, and $\zeta$ corrects for it. Equation 1.4 relates $\beta$ mathematically to other quantities:

$$\beta = T_D - (k \cdot n \cdot \Delta t) \qquad (1.4)$$

where:
- $\Delta t$ = is the sampling interval for the basic control computation or, more simple, the length of time that switch 19 is closed; and
- $n$ is a numerical factor called the storage sample poll interval or, more simple, the interval between $i$ and $j$, which have been defined previously.

Now that the quantities $\Delta t$, $n$, $j$ and $i$ have been introduced, a numerical example of their inter-relationship will be given as an aid in understanding them. If switch 19 is closed, or operated, at the rate of 10 cycles per second, then $\Delta t$ is equal to 0.1 second. Over a period of one second, $i$ is then increased by a factor of 10. If the quantity $n$ has a numerical value of 2, then over a period of one second, $j$ is increased by a factor of 5.

Up to this stage, then, sufficient information has been generated in regulation logic 22 to solve equation 1.2 or, more generally, to bring forward the difference between the oldest stored value of the controlling variable and the current value of it. Still another calculation is necessary though to provide a numerical value, or simulation, of the minimum phase process and instrument dynamics; that calculation is expressed in equation 1.5:

$$E^*(i) = \alpha_0 \cdot Z^*(i) + \alpha_1 \cdot Z^*(i-1) + \ldots + \alpha_P \cdot Z^*(1-P) + B_1 E^*(i-1) + \ldots \qquad (1.5)$$

where:
- $\alpha_0$ through $\alpha_P$ and $B_1 E^*(i-1) \ldots$ are coefficients selected to simulate minimum (or stable) phase process and instrument dynamics; these are controller parameters which may be formulated empirically for the particular process controlled—see, for example, R. C. Dorf, M. C. Farren, C. A. Phillips, "Adaptive Sampling Frequency for Sampled-Data Control Systems," *IRE Transactions on Automatic Control*, Vol. AC-7, No. 1, January, 1962, pages 38–47. Note that $B = \beta$ in the article.

Thus, by following the above method of calculation, regulation logic 22 generates a process control signal which is available for utilization with other associated equipment of the digital to analog converter type. While the characteristics of a particular process would dictate certain changes or modifications to the equipment for practicing this invention, regulation logic 22 could be implemented by an IBM 1710 or 1800 series computer, especially designed for process control purposes. As an example, when using such equipment, the entire regulatory operation could be accomplished in less than 1.5 to 2 times the process dead time. The basic computation time may be in the vicinity of milliseconds in the more current digital computers. For example, the implementation of logic in accordance with the above description of sequence logic 18 and regulation logic 22 may be accomplished with an IBM 1800 computer by one with ordinary programming skills. The specific method of accomplishing the implementation is defined by reference to the following publications: *IBM 1800 Time Sharing Executive System Specifications Manual*, Form No. C26-5900-0, 1964; *IBM 1800 Fortran Language Manual*, Form No. C26-5905-3, 1964; and *IBM 1800 Assembly Language Manual*, Form No. C26-5882-1, 1964. These publications are available from IBM, Data Processing Division, 180 East Post Road, White Plains, New York 10601.

As noted earlier, sequence logic 18 interprets the error signal E made available from summing means 16 so as to determine whether or not process 10 requires regulation. If process 10 requires regulation, then regulation logic 22 is operated and generates a control signal, as described above. When the process is operating within prescribed limits, however, a dead time testing operation may be performed so as to calculate a new value of dead time $T_D$. Testing logic 20 performs this dead time testing operation, which will now be explained.

Figure 4:
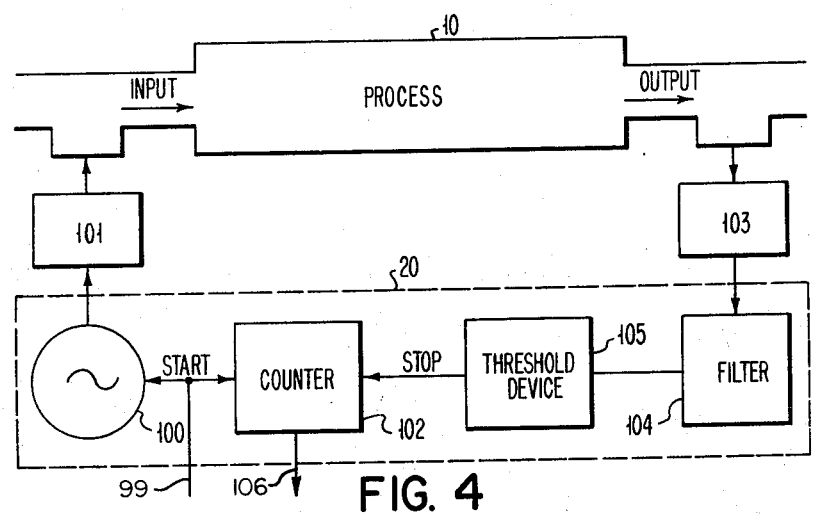
FIG. 4 shows one embodiment of apparatus for forming the dead time calculation.

With reference to FIG. 4, a simple yet effective means of performing this dead time test is shown. Although separable apparatus is shown for accomplishing this function, it should be noted that a digital computer could also perform the test by using mathematical relationships. Block 20 may be conceived in general terms as being electronic circuitry which is capable of impressing a high frequency disturbance onto process 10 and then calculating the dead time. Upon receipt on line 99 of the signal of logic 28 from FIG. 2, a source of high frequency initiates 100 supplies a process disturbance through a transducer 101 and thus introduces the disturbance to the input of process 10. The nature of transducer 101 is determined by the nature of the process being regulated; it may, for example, be a powered valve. An example of such a powered valve is the Foxboro Type 8262 Two-Way Solenoid Valve, available from Foxboro Co., above. Several other operations then take place, as will be described shortly. Counter 102 operation is started by the signal on line 99 at the time transducer 101 impresses the high frequency signal at the input to process 10. The high frequency signal propagates through process 10 and is sensed by transducer 103 associated with the output of process 10. An example of such a transducer is the CEC Type 4-311 Pressure Pickup, available from Consolidated Electrodynamics Corp., 300 North Sierra Madre Villa, Pasadena, California. Transducer 103, whose nature is also process related as is transducer 101, passes the signal on to filter 104 which, in cooperation with threshold device 105, distinguishes the high frequency signal from noise or other undesired conditions. Threshold device 105 in a simple embodiment could be a capacitor and diode, although its function could be simulated on a computer. The instance of high frequency signal extraction is manifested to counter 102 by a stop signal which stops the counter. Stored within counter 102, then, is a representation of process dead time.

Explaining this operation in more detail, the actual calculation of dead time preferably involves an initial period of waiting for the process to settle. During this period, an estimate of the amount of disturbance is noise, etc. and not the high frequency disturbance. From this estimate a threshold value is generated which then becomes the firing level for threshold device 105. Then, a high frequency signal is impressed from source 100. When filter 104 indicates, through the cooperation of threshold device 105, that the executed signal exceeds the threshold, counter 102 is stopped, and an indication of dead time is then available as the count of counter 102. Although the noted calculation is sufficient, a check may be performed in order to be sure that dead time has been noted. The test is essentially repeated; e.g., the filter output is averaged for a second period of time to establish a second threshold, and this executed signal value must exceed the second threshold. If it does, the initial value of dead time noted is a true value and the apparatus is then reset.

In essence then, the difference between the time of signal impression and the time of signal filtering is, in absolute terms, the dead time of the process. That dead time $T_D$ is then provided on line 106 to regulation logic 22 in order to update them.

Figure 5:
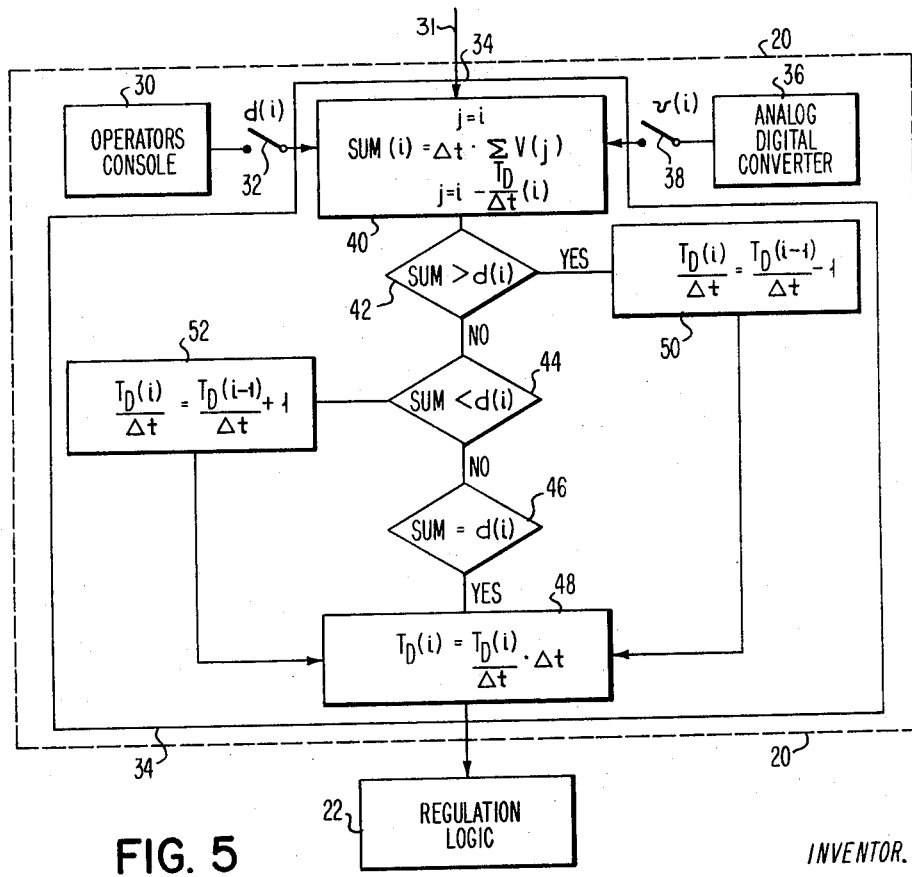
FIG. 5 is a symbolic logic diagram of certain steps for practicing a second preferred embodiment of this invention.

In a second preferred embodiment of this invention, a method of regulating those processes having a dead time due to distance-velocity lag is shown in conjunction with the symbolic logic diagram of FIG. 5. In such processes, distance or velocity of the controlled variable (that is, regulated variable) may vary with time, causing the process dead time to similarly vary with time. Such is the case, for example, in a process relating to the temperature control of transport flow where dead time variation arises from a change in flow demand. In order to compensate for that, the computation of the dead time itself is derived from certain values of velocity stored in the memory of an associated controller; a modification of the method used to calculate dead time in the first preferred embodiment is then necessary.

Although there are certain modifications necessary to enable this invention to be utilized in those processes having a distance-velocity lag, the general method is the same as that described with relation to FIG. 1. Thus, in FIG. 5, the logical operations necessary to be practiced by testing logic 20 are shown within the dotted lines labeled 20, and the logical operations necessary to practice the regulatory function are simply shown as block 22.

In the processes experiencing a distance-velocity lag, distance and the velocity of the controlled variable may be related as shown in equation 2.0:

$$\varsigma(t) = \int_{t-T_D}^{t} V(t)dt \qquad (2.0)$$

where:
$s(t)$ = distance as a function of time; that is, the distance of the controlled variable from a given point at a particular time and
$V(t)$ = velocity as a function of time; that is, velocity of a controlled variable at a particular time. time
It is assumed that $s(t)$ and $V(t)$ are either measurable or can be determined readily from such relation as velocity being equal to flow divided by effective area. In order to solve for dead time $T_D$, the integral of velocity is maintained over a period of time equal to the dead time$T_D$, and, further, it is equated to distance.

With general reference to FIG. 5, the measurement and evaluation steps necessary to calculate dead time are shown in response to a signal on line 31 from sequence logic 48. Measurements of the controlled variable's distance from a datum are inserted from an operator's console 30 through switch 32 to a calculating procedure shown generally as block 34. Similarly, measurements of the velocity of the controlled variable at discrete times are provided from a suitable transducer, or digital to analog converter 36, through switch 38 to calculating block 34.

Continuing with the general description of FIG. 4, in block 40 a sum of computed velocity is carried over a time period equal to the dead time. This is expressed by equation 2.1:

$$\text{Sum}(i) = \Delta t \sum_{j=i-\frac{T_D}{\Delta t}(i)}^{j=1} \qquad (2.1)$$

where $(i)$ is distance and $V(j)$ is velocity at time $t$. It is then necessary to test this sum against the distance of the controlled variable, and blocks 42, 44, 46 express this test. If the sum does not equal the transport distance, the lowest bound on the summation is in error; and that is in error because the value of dead time is in error. So a new dead time must be calculated, as shown in block 48.

With more particular reference to FIG. 5, as shown in block 42, if the sum of computed velocity is greater than the transport distance, then equation 2.2 as shown in block 50 is true:

$$\frac{T_D(i)}{\Delta t} = \frac{T_D(i-1)}{\Delta t} - 1 \qquad (2.2)$$

Following that, the calculation proceeds to the equation 2.3 in block 48 and it is solved for $T_D$:

$$T_D(i) = \frac{T_D}{\Delta t}(i) \cdot \Delta t \qquad (2.3)$$

The new value of dead time $T_D$ available from equation 2.3 is then passed on to the regulation logic in block 22.

If, however, the sum of computed velocity is less than the distance $i$, as shown in block 44, the relationship of equation 2.4 is true, and this is shown in block 52:

$$\frac{T_D}{\Delta t}(i) = \frac{T_D}{\Delta t}(i-1) + 1 \qquad (2.4)$$

The calculation then proceeds to equation 2.3 in block 48, and a new value of dead time $T_D$ is calculated and made available to the regulation logic in block 22.

Should the sum of computed velocity be not greater than or less than the distance, then, as indicated in block 46, it must be equal to t the distance; the relationship of equation 2.5 is then true:

$$\frac{T_D}{\Delta t}(i) = \frac{T_D}{\Delta t}(i-1) \qquad (2.5)$$

A new value of $T_D$ must then be calculated according to equation 2.3 in block 48 and passed on to regulation logic 22 as noted above.

As noted, any of a number of digital computers could operate upon these process measurements to provide the current value of dead time $T_D$ necessary for efficient process regulation. It is desirable to store an initial, approximate value of dead time in the computer in order to minimize the time necessary to calculate the most current value; the approximate value may be obtained from experience or preliminary measurements.

Having described the first and second preferred embodiments of this invention, it may be noted that the methods disclosed lend themselves to the control of any process having a dead time and, as such, the elements of logic 18, testing logic 20, regulation logic 22 could be implemented by electrical, pneumatic or hydraulic means. One suitable way of implementing the logic shown there is to employ an IBM 1710 type machine or an IBM 1800 machine—both of which are digital computers specifically designed for process control purposes. However, other means of implementing this logic will occur to those skilled in this art. The IBM 1800 computer may be arranged to implement the above logic by one having ordinary programming skills. The specific method of accomplishing the implementation is defined by reference to the three publications available from the IBM Data Processing Division described above. As a further aid to understanding the scope of this invention, it may be helpful to set forth some of the mathematics relating to dead time processes. Also, it will be shown mathematically that processes having a multiplicity of delays may be represented by mathematical models of processes having a single dead time. Thus, the method of the first and second preferred embodiments of this invention may be applied to the latter processes also.

In the earlier discussions of this invention, it was noted that the invention had general application to those processes characterized by dead time and examples of such processes were cited. It is common for those skilled in these arts to express the characteristics of certain processes in mathematics. A brief exposition of mathematical relationships for these processes is presented here so as to aid the reader in visualizing the characteristics of processes which can be controlled by this invention.

Dead time occurs in a variety of processes where it is necessary to provide closed-loop regulation of the output variable. Some processes develop their dead time as a result of transportation or distance-velocity lag. Such processes include strip rolling, as well as composition, or thermal, control in fluid flow; in those processes the manipulated variable (e.g., temperature of a heating coil) is remote from the measured variable (e.g., temperature of the process medium). Other processes develop dead time in the analytical instruments required for measurement. These processes often possess a so-called true transport delay as indicated in equation 3.0:

$$c(t) = K \cdot m(t-T_D) \qquad (3.0)$$

where:
$t$ = time
$T_D$ = dead time
$c(t)$ = measured or controlled process variable (a function of time)
$m(t)$ = manipulated or controlling process variable (a function of time)
$K$ = system gain These functions have the transfer function of equation 4.0:

$$\frac{C(s)}{M(s)} K \cdot e^{-T_D s} \qquad (4.0)$$

where:
$s$ = the Laplace operator
$e$ = natural logarithm base

Another class of processes which develop apparent dead time are those processes in which multiple delays are controlled in series. An example of such processes may be found in the control of temperature where the manipulated heat variable is separated from the temperature measurement by multiple heat sinks. The dynamic regulation developed for true dead time processes can be applied to these apparent dead time processes. The similarity in these processes can be shown by examining the Maclaurin series expansion of the true dead time function $$e^{-T_D s}$$

which results in an infinite number of multiple delays.

$$e^{-T_D s} = 1 - T_D s + \frac{T_D^2 s^2}{2!} - \frac{T_D^3 s^3}{3!} \cdots$$

$$= \frac{1}{1 + T_D s + \frac{T_D^2 s^2}{2!} + \frac{T_D^3 s^3}{3!} + \cdots}$$

$$= \lim_{n \to \infty} \left( \frac{1}{1 + \frac{T_D s}{n}} \right) \qquad (5.0)$$

In equation 5.0, each term in the Maclaurin series represents the delay due to an individual segment of the process or its associated equipment; in the example chosen, each of the multiple heat sinks contributes a delay and they have a cumulative effect. The true dead time function $$e^{-T_D s}$$

represents this cumulative delay as the number of delays becomes sufficiently large.

Since a plurality of delays approximate the true dead time function, it can be seen that a controller may be readily interchanged between apparent dead time and true dead time processes. Thus, the inventive method set forth herein may be applied to either type of process.

An example of a computer program to carry out the method of dead time calculation illustrated in FIG. 5 together with the calculation of E* of FIG. 3 as pointed out in equation 1.5 is shown below in program listing form. The program is arranged to operate with the IBM 1800 data acquisition and control computer as described. The program is in FORTRAN language and is intended for use with a liquid flow process having two, parallel, input flows being controlled, the two flows joining after measurement and before subsequent processing, such as a heat exchanger. The measurements made are those of differential pressure for each line, called "DP1" and "DP2" respectively. These measurements in the program are made by sample analog to digital inputs to the 1800 called, respectively, "ADC(2)" and "ADC(3)." The differential pressures are converted to quantity flow measurements in accordance with Bernoulli's law, wherein flow $Q = C \sqrt{DP}$, C being a constant. Since the total area of the lines is constant, even where joined, the total flow rate TOTAL Q = Q1+Q2 is directly proportional to the flow velocity, which is shown in the program as VMV(1) = TOTAL Q.

Also in the program, DT is the time period between successive pollings or samplings by the computer of the ADCs, shown as switch 38 in FIG. 5. Thus, DT is equivalent to $\Delta t$ in FIG. 5. TRSH is a preset threshold gain to, in effect, filter by lowering the gain within the threshold limits. TD represents the dead time in the program. PT represents the process time constant, which in this example was found to equal the dead time. PG represents the process gain and TSP is a constant. IS3 and IS7 are digital settings on the operator's console which are read by program. Switch 32 of FIG. 5 is represented by "-TEST OPERATOR ENTRY." Lastly, Z in FIG. 3 is "OUTPUT" in the program.

In viewing the program listing, "X INITIALIZATION ..." to "X ENTER PROGRAM" comprises variable initialization prior to the closing of loops. From "X ENTER PROGRAM" to "9892" comprises entry into the subject program from a regulation program or from operation of a controller. "9892" is the polling inquiry, and from "9892" to "9893" is the threshold filter. From "X COMPUTE FLOWS" to "X DEAD ..." comprises scaling of the ADC measurements and the flow velocity computation. From "X DEAD ..." to "X COMPUTE ES" is the computation of dead time in accordance with FIG. 5. From "X COMPUTE ES" to "X DEAD TIME" comprises the computation of E* of FIG. 3 by conditioning and modeling. From "X DEAD TIME" to "X SET DAC" comprises the combination of E and E* (called ES in the program) with the threshold, and "X SET DAC" comprises supplying the information to the controller.

The program listing is:

```
ZJOB
ZDUP
DELETDETIM
ZJOB
ZFORX
LDISKDEDTIM
     VARIABLE DEAD TIME ALGORITHM
```

```
              COMMON I48,I49,I43,I44,I18,I27,I50,I51
              DIMENSION VM(10)
              DIMENSION VMV(10)
9999          PAUSE
X     INITIALIZATION OF VARIABLES
              IPOLL=4
              TSP=0.33
              ITSP=100.*TSP
              IRC=0
              POLL=IPOLL
              K=10
              FK=K
              TD=TSP*POLL*FK
              PT=TD
              PG=0.303*TD
              DT=POLL*TSP
              FKS=2.28
              PTS=1.0
              PGS=0.303
              SUM=200.0
              OUTPUT=640.0
              OUTLST=OUTPUT
              I18=0
              CAU=1.0
              ES=0.0
              TRSH=2.56
              STRSH=0.313*TRSH
              TRGN=0.003
              SUMV=2.0
              DO 20 I=1,10
20    VM(I)=SETPNT
              DO 25 I2=1,10
25    VMV(I2)=0.5
              CALL INTPRT
              CALL UNMK
X     ENTER PROGRAM
      1       CONTINUE
              IF(I51-IPOLL)995,2,2
X     TEST OPERATOR ENTRY
              IF NONE GO BACK AND WAIT FOR NEXT PERIOD
995           IF(I18)9892,9893,9892
9892          CALL OPENT(IS1,IS3,IS7)
              I18=0
              TRSH -X.X-- DEGREES
              TRSH=IS3
              TRSH=0.32*TRSH
              STRSH=0.313*TRSH
              TRGN ---X.XXX
              TRGN=(IS7/1000)
              TRGN=IS7
              TRGN=0.001*TRGN
9893          IF(I51-IPOLL) 9894,2,2
9894          CALL WAIT
              GO TO 1
2             I51=0
X     COMPUTE FLOWS
              DP1=(ADC(2)-2000)
              IF(DP1)710,710,711
710           DP1=0.0
711           CONTINUE
              DP1=DP1*(5.E-6)
              DP2=(ADC(3)-2000)
              IF(DP2)720,720,721
720           DP2=0.0
721           CONTINUE
              DP2=DP2*(.000125)
              Q1=SQRTF(DP1)
              Q2=SQRTF(DP2)
              TOTALQ=Q1+Q2
X     DEAD TIME COMPUTATION
              IF(CAU)21,211,21
21            CONTINUE
              TIME VARIANT VELOCITY COMPUTATION OF K
              ADVANCE STORAGE IN VELOCITY LAW
              DO 23 M=1,9
              M1=11-M
              M2=10-M
23            VMV(M1)=VMV(M2)
              VMV(1)=TOTALQ
              SUMV=0.0
              DO 230 I=1,K
230           SUMV=SUMV+VMV(I)*DT
              FK=(FKS/SUMV)*FK
              K=FK
              IF(K-1)4,4,5
4             K=1
5             CONTINUE
              IF(K-10)211,211,6
6             K=10
211           CONTINUE
              FK=K
              TD=TSP*POLL*FK
              PT=TD*PTS
X     COMPUTE ES
      5       ADVANCE STORAGE IN DEAD TIME
              DO 10 I = 1,9
              J1=11-I
              J2=10-I
10            VM(J1)=VM(J2)
              VM(1)=OUTPUT-200.0
              DTIME=TD
7             B(1)=(1/(PT+DT))*DT
              X(0)=(1/(PT+DT))*DT*PG
              X(K-1)=-X(0)
              ES=X(0)*VM(0)+X(K-1)*VM(K-1)+B(1)*ES(1)
              FEDBK=ADC(4)
              ERROR=SETPNT-FEDBK*0.1
X     DEAD TIME
72            CONVENTIONAL AUTOMATIC VS DEAD TIME CONTROLLER TEST
              IF (DTC)102,112,102
102           CONTINUE
              IF(ERROR-TRSH)5102,5102,5202
```

```
5102    EKP=(ERROR-ES)*TRGN*GP
        GO TO 5302
5202    CONTINUE
        ERROR=ERROR-ES
112     CONTINUE
        EKP=GP*ERROR
5302    CONTINUE
        SUM=SUM+GI*EKP
        IF(SUM-200.0)12,14,14
12      SUM=200.0
14      CONTINUE
        IF(SUM-999.0)114,114,13
13      SUM=999.0
114     CONTINUE
        OUTPUT=EKP+SUM
```

Summarizing, a general method for controlling a process having a dead time has been disclosed. That method includes a determination of the status, or condition, of the controlled variable and the subsequent implementation of a process regulating action should that be necessary. If such regulation is unnecessary, a current value of process dead time is calculated and made available for subsequent regulatory operations.

Also, a general method for calculating the dead time of a regulated process so as to update a mathematical model of that process stored in a controller, has been set forth. The method resides in the introduction of a perturbation to the controlled variable of the process, noting the time of perturbation introduction, filtering out the perturbation at the process output or at an auxiliary station, noting the time of filtering and then calculating the process dead time by determining the absolute value of time between the time of perturbation and the time of filtering.

In another embodiment of the invention, a method of calculating dead time is disclosed which has particular utility in those processes experiencing a transport- (or distance) velocity lag. In that method, mathematical relationships are established between instantaneous values of process medium velocity and the distance of that medium from a given point; the solution of these mathematical relationships will yield a value of process dead time. That dead time value is then incorporated into a mathematical model of the process in a digital computer serving as a controller so as to optimize the operation of the controller.

While the invention has been particularly shown and described with reference to preferred embodiments thereof, it will be understood by those skilled in the art that the foregoing and other changes in form and details may be made therein without departing from the spirit and scope of the invention.

I claim:

1. In a method for regulation of processes having dead time comprising the steps of:
generating a status signal representing the value of a controlled variable in said process;
generating a set point signal representing a predetermined standard value of said controlled variable;
comparing said status signal to said set point signal; and
generating in response to said comparing step an error signal representing quantitatively the amount said status signal exceeds said set point signal;
the improvement thereto comprising the additional steps pre-established
determining whether said error signal exceeds a pre-established error value or not;
passing said error signal onto regulatory apparatus in order to regulate said process if said determining step indicates said error signal exceeds said pre-established error value; and
impressing a perturbation into said process to calculate the dead time thereof if said determining step indicates said error signal does not exceed said pre-established error value.

2. A method of the type set forth in claim 1 additionally including, in response to said passing of said error signal onto said regulatory apparatus, the steps of:
impressing said error signal onto a summing means;
impressing onto said summing means a first modified error signal, reflecting a conditioning of said error signal by a value of process dead time and by the process and instrument dynamics;
generating a second modified error signal from said summing means; and
generating a control signal in response to said second modified error signal by operating on said second modified error signal with predetermined gain constants characteristic of said process.

3. In a method of process regulation for regulating a dead time process having a controlling variable and a controlled variable, comprising the steps of:
generating a first electrical signal representative of the status of said controlled variable;
generating a second electrical signal representative desired status of said controlled variable; and
generating an error electrical signal representative of the difference between the actual status of said controlled variable and the desired status thereof;
the improvement thereto comprising the additional steps of:
testing said process in accordance with a dead time testing algorithm in response to said error electrical signal when said error electrical signal is below a datum value, thereby generating a dead time electrical signal quantitatively indicative of the process dead time; and
supplying said dead time electrical signal to regulatory apparatus for said process, thereby providing said regulatory apparatus with a current value of process dead time.

4. A method for determining the dead time of a process having a controlled variable and a controlling variable so as to update a model of that process, comprising the steps of:
sensing said controlled variable to generate a first signal representative of the deviation of said controlled variable from a predetermined set point;
comparing said first signal to a predetermined error signal and determining whether said first signal is less than said predetermined error signal;
impressing at a first process station a disturbance signal onto said process at a time $T_1$ in response to said determination that said first signal is less than said predetermined error signal;
filtering out said disturbance when received at a second process station at a time $T_2$; and
calculating process dead time between said stations by determining the time difference between $T_1$ and $T_2$.

5. A method for determining the dead time of a process having a controlled variable and a controlling variable so as to update a model of that process, comprising the steps of:
sensing said controlled variable to generate a first signal representative of the deviation of said controlled variable from a predetermined set point;
comparing said first signal to a predetermined signal representing a predetermined error limit;
impressing at the process input a disturbance signal onto said process at a time $T_1$ in response to said determination that said first signal is within said predetermined error limit;
filtering out said disturbance when received at a process station at a time $T_2$; and
calculating process dead time between said process input and said station by determining the time difference between $T_1$ and $T_2$.

6. A method for determining the dead time of a process having a controlled variable and a controlling variable so as to update a model of that process, comprising the steps of:

sensing said controlled variable to generate a first signal representative of the deviation of said controlled variable from a predetermined set point;

generating a second signal representative of some predetermined error limit of said controlled variable;

comparing said first signal to said second signal, thereby determining whether said controlled variable is within said predetermined error limit;

impressing upon said controlling variable a disturbance signal at time $T_1$ in response to said determination that said controlled variable is within said predetermined error limit;

filtering out said disturbance when received at a station associated with said controlled variable at a time $T_2$; and calculating process dead time by determining the time difference between $T_1$ and $T_2$.

7. A method for determining the dead time of a regulated process having a controlled and controlling variable so as to update a mathematical model of said process, comprising the steps of:

measuring said controlled variable to generate a signal representative of the controlled variable value;

determining whether said signal is within predetermined limits;

impressing a high frequency signal onto a process controlling variable in response to said determination that said controlled variable is within said predetermined limits;

measuring the time $T_1$ of impression of said high frequency signal by starting a count;

filtering said high frequency signal when received at the process output;

measuring the time $T_2$ of filtering by stopping said count; and indicating the interval between the measured times $T_1$ and $T_2$ by sensing said count.

8. A method for determining the dead time of a process having a controlled variable and a controlling variable so as to update a mathematical model of that process, comprising the steps of:

sensing said controlled variable to generate a first signal representative of the value of said controlled variable;

comparing said first signal to predetermined limits surrounding a set point of said controlled variable and determining that said first signal is within said predetermined limits;

impressing a high frequency signal onto said controlling variable at a time $T_1$;

storing the value of time $T_1$;

filtering out said high frequency signal when received at the output of said process at time $T_2$;

storing the value of time $T_2$; and calculating the dead time of said process by subtracting $T_1$ from $T_2$.

9. A method for determining the dead time of a process having a controlled variable and a controlling variable so as to update a machine-stored mathematical model of that process, said process having a variable dead time due to differences in velocity and distance of a process medium, comprising the steps of:

generating a first plurality of electrical signals, each of said signals representing the velocity of said process medium at discrete periods of time;

generating a second plurality of electrical signals contemporaneously with said first plurality of electrical signals, each of said second plurality of electrical signals representing the distance of said process medium from a datum point at discrete periods of time;

feeding individual ones of said first plurality of signals in a serial fashion and individual ones of said second plurality of signals in a serial fashion to computing apparatus; and calculating the dead time $T_D$ of the process according to the equation:

$$T_D(i) = \frac{T_D}{\Delta t}(i) \cdot \Delta t$$

10. A method for determining the dead time $T_D$ of a process having a controlled variable and a controlling variable so as to update a mathematical model of that process, comprising the steps of:

sensing said controlled variable to generate a first signal representative of said controlled variable;

comparing said first signal to predetermined error limits surrounding a set point of said controlled variable and determining whether said first signal is within said predetermined error limits, a second signal representing an average disturbance of said process due to process noise while allowing said process to settle;

impressing said second signal on a threshold device, adjusting the threshold level of said threshold device to the level of said second signal;

impressing a high frequency signal onto said process and initiating a counting operation in a counter at a time $T_1$;

sensing the response of said process and filtering out said high frequency signal from said process response when received at a time $T_2$ by applying a third signal representing said filtered high frequency signal to said threshold device;

ceasing said counting operation at said time $T_2$ by applying the output of said threshold device to said counter;

generating a fourth signal quantitatively representing process dead time $T_D$ derived from the count of said counter; and updating a model of said process in response to said fourth signal.

* * * * *

PO-1050
(5/69)

UNITED STATES PATENT OFFICE
CERTIFICATE OF CORRECTION

Patent No. 3,671,725   Dated June 20, 1972

Inventor(s) Roger M. Bakke

It is certified that error appears in the above-identified patent and that said Letters Patent are hereby corrected as shown below:

In Col. 6, line 50, delete the word "initiates" and substitute therefor --signal--; and delete the word "supplies" and substitute therefor --initiates--;

In Col. 7, lines 50-55, the equation:

$$"\zeta(t) = \int_{t-T_D}^{t} V(t)dt"$$

should read:

$$--s(t) = \int_{t-T_D}^{t} V(t)dt--;$$

In Col. 8, lines 5-10, the first line of the equation:

$$"\text{Sum } (i) = \Delta t \sum^{j=1} "$$

should read:

$$--\text{Sum}(i) = \Delta t \sum^{j=1} V(j)--;$$

In Col. 13, line 69, "pre-established" should be deleted and --of:-- substituted in its place;

In Col. 14, line 73, between the words "said" and "station" please insert the word --process--.

Signed and sealed this 2nd day of January 1973.

(SEAL)
Attest:

EDWARD M. FLETCHER, JR.
Attesting Officer

ROBERT GOTTSCHALK
Commissioner of Patents